United States Patent [19]

Andrews

[11] 4,359,783
[45] Nov. 23, 1982

[54] WEARING APPAREL AND METHODS FOR THE MANUFACTURING OF WEARING APPAREL

[75] Inventor: Richard C. Andrews, Coshocton, Ohio

[73] Assignee: Becton Dickinson and Company, Paramus, N.J.

[21] Appl. No.: 233,743

[22] Filed: Feb. 12, 1981

[51] Int. Cl.³ .................. A41D 19/00; A41B 13/10; A43B 13/22; B32B 5/06
[52] U.S. Cl. .................. 2/161 R; 2/48; 2/164; 2/167; 2/243 R; 36/98; 36/4; 428/300; 28/112
[58] Field of Search .............. 2/159, 164, 161 R, 167, 2/48, 243; 28/112, 107; 36/4, 9, 25 R, 30 R, 59 D, 98; 428/300, 301, 302

[56] References Cited

U.S. PATENT DOCUMENTS

| | | | |
|---|---|---|---|
| 1,159,155 | 11/1915 | Ayres | 28/112 X |
| 1,529,701 | 3/1925 | Hewitt | 28/112 X |
| 1,629,923 | 5/1927 | McDermott | 28/107 X |
| 1,774,204 | 8/1930 | Levin | 28/112 X |
| 2,059,132 | 10/1936 | McDermott | 28/107 X |
| 3,173,150 | 3/1965 | Mohler | 2/167 |
| 4,089,069 | 5/1978 | Vistins | 2/161 R |
| 4,151,662 | 5/1979 | Vistins | 36/98 |
| 4,172,293 | 10/1979 | Vistins | 2/161 R X |
| 4,174,542 | 11/1979 | Vistins | 2/48 |

Primary Examiner—Richard J. Scanlan, Jr.

[57] ABSTRACT

Methods are provided for producing protective and useful wearing apparel, such as work gloves, work boots and aprons, and wearing apparel so produced by such methods. The methods include joining a non-woven fibrous web, such as needled felt to a knitted web, such as a knitted jersey, and utilizing a needled staple fiber preferably from the non-woven web to join the two webs together into a formed laminate. The joining procedure is such that the finished laminate includes the needled staple fiber extending from one surface of the web to form a base surface for a subsequent application of an elastomeric coating. The resulting coated surface is textured to provide a gripping surface, for example, for use in gloves to handle smooth surfaced items with sharp edges, such as glass. The remaining exposed non-woven fibrous web surface forms a soft protective internal surface for the weaving apparel such as gloves or boots. The outer coating may be liquid impervious, or it may be permeable in order to provide a fabric laminate which is "breathable".

28 Claims, 5 Drawing Figures

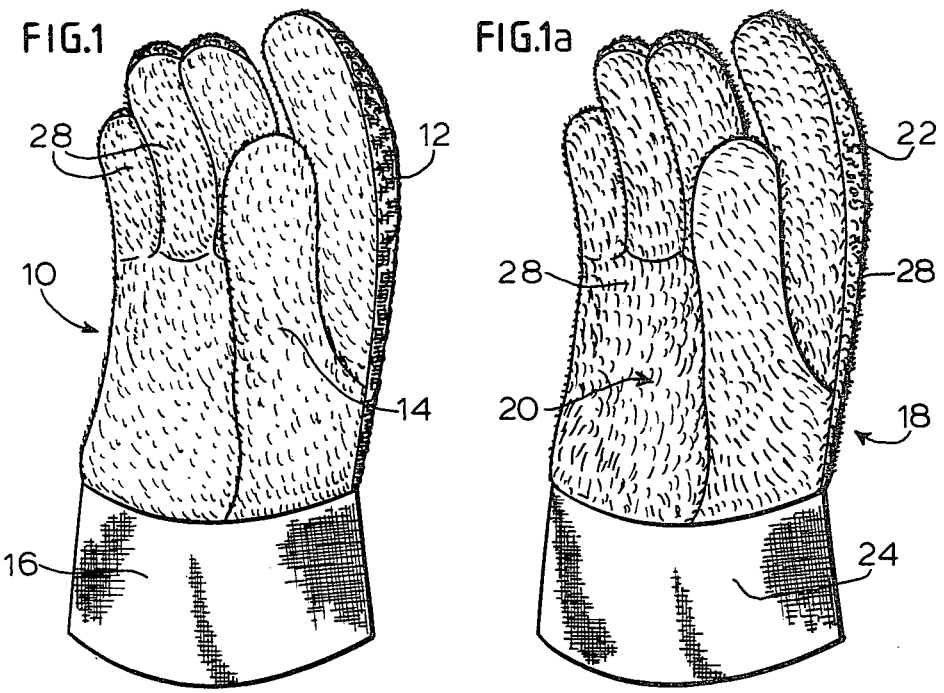
FIG.1
FIG.1a
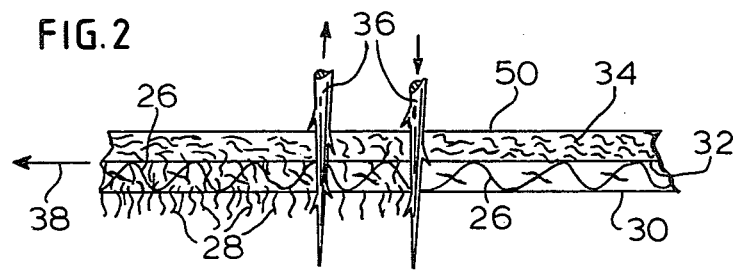
FIG.2
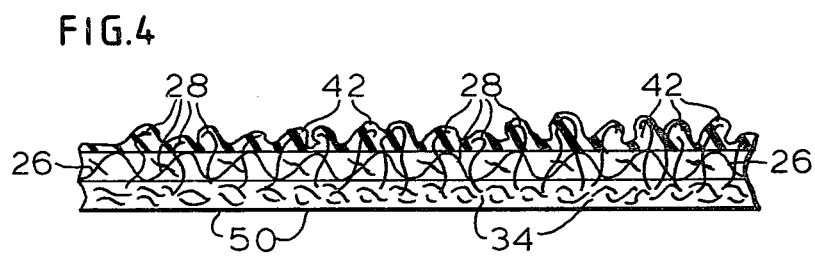
FIG.4

WEARING APPAREL AND METHODS FOR THE MANUFACTURING OF WEARING APPAREL

BACKGROUND AND STATEMENT OF THE INVENTION

This invention relates to methods for producing a laminate useful in the manufacture of wearing apparel, and particularly wearing apparel for use in a work environment such as work gloves, boots, sleeve guards and work aprons. The laminate includes a textured surface which is useful as a gripping surface for the work environment, and the method of the invention is such that the gripping surface may be controlled to be a liquid impervious or a breathable surface, as required. The invention includes joining a non-woven fibrous web, such as needled felt, to a knitted fabric web, such as knitted jersey. The non-woven fibrous web provides a surface which is soft and comfortable as an internal surface for the wearing apparel. The non-woven web also is useful in that it provides a cutting barrier for such material, as well as a "hot" and "cold" barrier. The two webs are joined together, utilizing a needled staple fiber, and preferably the fiber from the non-woven web itself, with the joining procedure being such that the fiber extends from the exposed surface of the knitted jersey to form a textured base surface for the reception of a subsequent coating. The coating is formed, preferably, from a synthetic polymer which may be knife applied or dip coated, depending upon the kind of surface required in the ultimate garment being produced. If the material is dip coated, all of the interstices of the exposed knitted surface web will be filled to provide a liquid impervious barrier for use in environments where it is important to have a "waterproof" surface. Alternatively, the coating may be knife applied or printed in order to leave uncoated interstices in the surface, to give a breathing function to the ultimate apparel being constructed.

There are many prior art arrangements for providing elastomer coated garments, such as work gloves. In this connection, reference is made to U.S. Pat. Nos. 3,173,150; 4,089,069; 4,151,662, and 4,174,542. It is particularly desirable to have a wrinkle-finish type work glove, for example, for handling smooth articles, such as sheets of glass and metal sheets as discussed above. Wrinkle-finish gloves generally provide a much higher resistance to abrasion and cutting by the sharp edges and also provide, as will be understood, more efficient gripping than a smooth coated glove.

One approach to obtaining textured or "wrinkle-finish" gloves involves dipping a jersey knit fabric glove into an elastomer coating. Before curing completely the elastomer coating, the coated glove is dipped into a solvent which causes the elastomer to swell. The swelling has the effect of causing an uneven surface to form which is the wrinkle finish. One disadvantage of such an approach is the use of hazardous solvents, and the commerical problems involved in producing such gloves, wherein certain handling procedures are required for solvent fumes. Moreover, the exposure of the elastomeric coating to a solvent weakens the coating and reduces the life of the garment produced by the material so formed.

The latter three patents mentioned above of Maris Vistins teach a laminate for use in making garments, and particularly protective garments such as work gloves, wherein the use of solvents is avoided. The Vistins teachings produce a textured surface on a protective garment utilizing a non-woven web. The non-woven web serves as the exterior surface of the protective garment and is the surface covered in the various subsequent coating techniques, whether in dipping or in the application of a knife procedure for coating the web. Further in the case of the Vistins procedures, the knitted jersey is utilized as the internal surface of the garment while the non-woven fibrous web is used as the external surface. The non-woven fibrous web, because of its "fuzzy" exterior surface, provides an uneven surface for receiving an elastomer coating which is textured to provide the desired gripping action of a subsequent garment made from the laminate so produced.

However, certain disadvantages are involved in the use of laminate in accordance with the Vistins teachings. That is, the use of the non-woven fibrous web as the external surface which is subsequently coated causes certain problems during the production of the glove liner which is subsequently coated. That is, the fibrous web is easily disturbed and pulled apart in its exposed state during the production of the glove liner, and the subsequent loading of the liner onto the equipment used for the application of the elastomeric coating. Moreover, there is not sufficient control of the non-woven fibrous web exposed surface so as to control the degree of texture desired in the resulting wearing apparel made from the laminate.

DETAILED DESCRIPTION OF THE INVENTION

With this invention, by contrast, a laminate is provided for the subsequent production of wearing apparel, such as work gloves, work boots and aprons which reverses the two webs provided in the Vistins teachings. That is, the non-woven fibrous web, such as needled felt, is joined to a woven or knitted web, such as knitted jersey with the ultimate exposed surface of the knitted jersey being utilized as the *external* surface of the resulting garment, while the non-woven fibrous web is used as the interior surface of the resulting garment. The two webs are joined together in a laminate by a needling procedure wherein a staple needled fiber is utilized from the non-woven web which fiber extends from the exposed surface of the knitted jersey to provide the ultimate texture for the material which is formed into a garment.

Because of this, the number, and extent of penetration, and the denier of the fiber during the needling procedure controls the resulting surface texture of a garment being produced. That is, the depth of penetration, the density of penetration and the fiber denier all are variables wich can be used to control the ultimate characteristics of the surface of a garment being produced. Moreover, by utilizing the non-woven fibrous web in its unaltered state, a soft comfortable interior surface is provided for the ultimately formed wearing apparel as it is worn. In addition, it need not be napped as is the case with the prior art laminate produced for such work gloves.

With the degree of needling of the non-woven web to the knitted material such as knitted jersey, the non-woven web becomes an integral part of the fabric construction and the body thereof holds in place more firmly for the subsequent handling operations. The non-woven web maintains its "pad" characteristics, which provide an insulator property to the ultimate garments, as well as protection from sharp objects.

In considering generally the conditions for carrying out the method of the invention here for producing the laminate of the invention here, one may note that it is preferable to use the synthetic fiber from the non-woven fiber web as the staple fiber for joining the two webs together. The selection of the synthetic fiber for use in the joining procedure provides a wide latitude in the ultimate properties of the laminate for the texture of the coating, as required and desired in the ultimate apparel being produced, and the properties of that apparel. Representative staple fibers which may be used if selected separately from the non-woven web are polyesters, polyamides, such as Nylon, and polyolefins, such as polypropylene or polyethylene. Rayon may be used if a "wet dog" appearance is desired. The hydrophilic properties of rayon give this wet dog appearance. The rayon behaves like a cotton fiber in that the ultimate elastomer coating tends to coagulate by the mechanism of rapid dehydration.

With respect to the fibrous non-woven web, it may be produced on conventional carding or garnett machines. Representative materials which may be used are wool, polyesters, polyamides, such as Kevlar or Nomex which are products of DuPont, polyolefins, such as polypropylene and polyethylene, and copolymers of acrylic acid, such as polyacrylonitrile. Polyester is preferred. The other web, which may be knitted or woven, may be cotton, polyester or a cotton-polyester blend, for example, if knitted, or Kevlar, Nylon or cotton, if woven, or cotton, or a cotton-polyester blend if a flannel.

As discussed above, the depth of penetration, the density of penetration, and the fiber denier are the variables by which a wide selection of surface texture characteristics may be obtained. The ability of the coated surface to allow moisture transmission, or to form an impermeable surface is more dependent upon the method of coating application. It has been found that a very light knife or printed coating gives protection to the fibers, while all of the interstices are not filled with the polymer coating. This has the effect of giving the final garment or wearing apparel a breathing characteristic. On the other hand, in order to obtain a coating that will resist the penetration of liquids, the coating must be continuous. To achieve this kind of property, a dipped coating is utilized.

In considering further the general conditions for carrying out the method, the two webs may be joined in a conventional needle punching machine, such as a Hunter Fiber-Locker TM machine. The depth of penetration will be such so as to cause the fiber to extend from the exposed surface of the woven or knitted web, as discussed above, and preferably within the range of between about 0.25 and 0.50 inches. The density of penetration will be within the range of between about 400 and 700 penetrations per square inch. The denier of the fiber will be selected to give the desired degree of texture to the surface as discussed above, and will vary within the range of between about 1.5 and 15.

Thus, with the method of the invention here, it is possible to produce fabric construction that will conform to complex shapes, as desired, by the use of knitted substrates. It is also possible to engineer into the fabric construction heat resistance or resistance to cutting and puncture, as required, such as by the application of polyamide fibers in the non-woven web or the knit substrate, thus offering enhanced protection to the wearer of the garment.

It will be appreciated that with the method of the invention here the laminates produced may be utilized in various configurations for wearing apparel. For example, a laminate may be utilized to provide a wrinkle surface to the palm of the glove while only a knitted jersey layer is utilized for the backside surface of the glove. Otherwise, the entire glove may be made to provide or to have a textured gripping and/or protective surface. By the same token, certain areas of a pair of work boots will require a gripping surface, such as the soles thereof, while it may be desirable to have the liners for forming the uppers formulated only of a knitted jersey. Moreover, certain areas of work gloves, for example, may not be coated, such as the cuffs of such gloves, while other areas may have a smooth coating, as required for flexibility, appearance and/or comfort.

DESCRIPTION OF THE DRAWINGS

FIG. 1 is a prospective view of a glove liner illustrating one embodiment of wearing apparel produced from the laminate of the invention, wherein the palm is constructed of the laminate of the invention, while the back is constructed of a conventional woven or knitted fabric;

FIG. 1a is a prospective view of a further embodiment of glove liner of the invention and produced in accordance with the method of the invention here to be subsequently coated wherein both the palm and the back portions of the liner are constructed in accordance with the method of the invention here;

FIG. 2 is a sectional view of a laminate produced in accordance with the method of the invention here;

FIG. 4 is a sectional view of the laminate of the invention, produced in accordance with the method of the invention, and similar to that of FIG. 2, but with the coating applied.

DETAILED DESCRIPTION OF THE INVENTION

Figure 3:
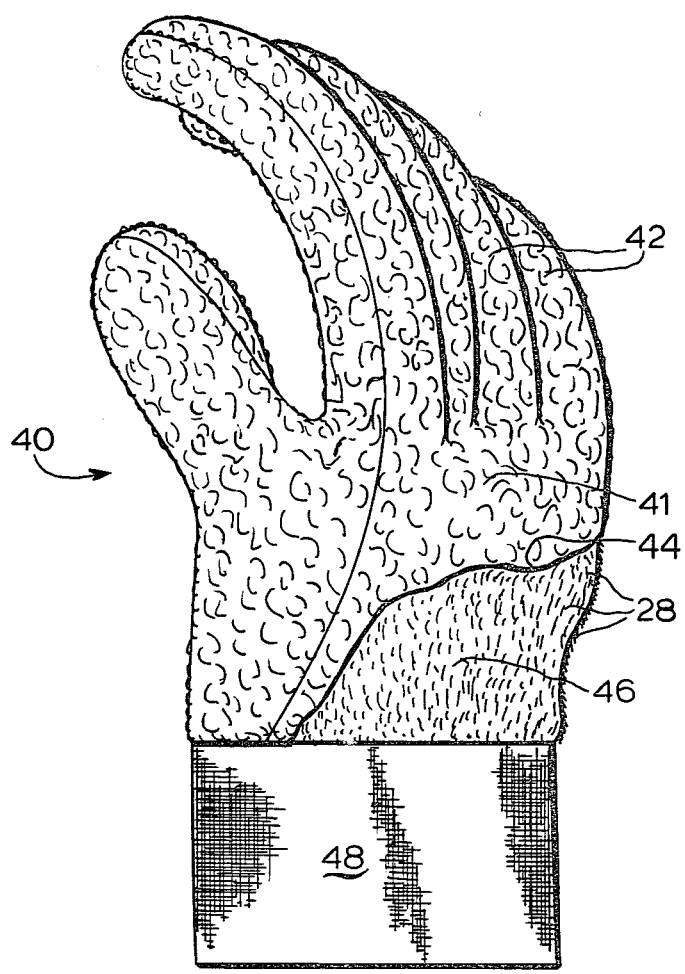
FIG. 3 is a prospective view of a coated glove produced in accordance with the method of the invention.

Referring to the drawings in which like reference characters refer to like parts throughout the several views thereof, in FIG. 1, a glove liner 10 is shown having an upper portion or backside 12 and a palm portion 14, with a cuff 16. Palm portion 14 is prepared as a laminate according to the invention here, whereas the backside 12 is comprised of a woven or knitted fabric web.

By contrast, the glove liner 18 shown in FIG. 1a has a palm portion 20 which is the same as the backside 22, with both portions prepared from a laminate produced in accordance herewith. Glove liner 18 has a cuff 24 similar to the cuff 16 of glove 10 in FIG. 1.

FIG. 2 shows a sectional view of a laminate utilized and formed in accordance with the method here for making the palm portion 14 of the glove 10 shown in FIG. 1 and both the backside and palm portion of the glove 18 shown in FIG. 1a. That is, the laminate is comprised of a non-woven fibrous web 34, which may be a needled cotton felt, for example. Web 34 is joined to a web 26, which may be a knitted cotton jersey, for example. The two webs are joined together by a needling action, in the direction of arrow 38, by needles 36 using the synthetic staple fiber from web 34. The procedure is such that the staple fiber extends from the surface 30 of the web 26, as shown at 28 in FIG. 2. The extended fibers 28 serve, ultimately, as the outer surface of the palm portion 14 of the glove liner of FIG. 1, for example. The fibers 28 extending from surface 30 may have varying degrees of denier, as discussed above, and as selected during the processing procedures for forming the webs 34 and 26 together. The heavier the denier, the higher degree of texture that will be secured in the ultimate garment produced by the laminate, in accordance herewith. The exposed surface 50 of the non-woven fibrous web, because of the density of penetration of the needles 36 has the appearance of becoming a part of the web 26 and serves as a warm soft interior surface for the subsequent wearing apparel produced, such as the internal surface of a glove.

Referring to FIG. 3, a glove 40 is shown with the backside surface 41 thereof having an elastomeric coating 42, and with a portion 46 left uncoated with the coating line being designated by 44. The extended staple fibers 28 serve to provide a base for the subsequent texture of the elastomeric coating 42 as shown in FIG. 4. It will be apparent that the density of penetration, the depth of penetration and fiber denier will have an effect upon the subsequent texture of the surface 42, as can be seen in FIG. 4.

With respect to the elastomeric coating used for coating the wearing apparel produced in accordance with this invention, such a coating may be a fused polyvinyl chloride plastisol, a rubber latex, or like elastomeric coating. Representative elastomeric compositions are as follows.

| COMPOSITION 1 | |
|---|---|
| Material | Parts By Weight |
| PVC Resin | 100 |
| Plasticizer | 70-120 |
| Stabilizer | 2-4 |
| Pigments | 3.5 |

As purely illustrative of a natural rubber dip formulation useful in accordance with this invention, one may note the following composition 2:

| COMPOSITION 2 | |
|---|---|
| Material | Parts By Weight |
| Natural Rubber Latex | 100 |
| Sulfur | 1.0 |
| Zinc Oxide | 3.0 |
| Antioxidant | 1.50 |
| Accelerator | 1.50 |
| Pigment, Stabilizer, Thickener | 5.0 |

As illustrative of a synthetic rubber dip formulation, one may note the following composition 3:

| COMPOSITION 3 | |
|---|---|
| Material | Parts By Weight |
| Neoprene Latex | 100 |
| Sulfur | 0.65 |
| Zinc Oxide | 3.0 |
| Antioxidant | 1.3 |
| Accelerator | 3.0 |
| Pigment, Thickeners, and Fillers | 5.0 |

As further illustrative of the method of the invention here, one may note the following examples in which wearing apparel is prepared. It is to be understood, however, that these examples are being presented with the understanding that they are to have no limiting character on the broad disclosure of the invention, as generally set forth herein, and as directed to men skilled in the art.

EXAMPLE 1

A fabric glove is produced having a surface texture similar to a suede leather with a superior wet and dry grip and with excellent resistance to penetration, cutting and abrasion. It is desirable that these aforementioned properties be characteristic of a glove produced from the laminate, in accordance with this procedure, but also that the glove have releasing moisture characteristics entrapped inside from perspiration. First, a suitable fibrous non-woven web of a staple polyester was selected. Subsequently, in a second selection, a knit fabric polyester was selected. The two webs were joined together by a conventional needling technique, utilizing the staple polyester material from the fibrous non-woven web, which resists matting down, and has a denier of 6. By continuous needling the non-woven web and the knit fabric, using a density of penetration of 700 penetrations per square inch and a depth of penetration of one-half inch, the two webs were joined together. Subsequently, after the knitting procedure, the constructed fabric laminate was knife coated using as the elastomeric compound Composition 3, as noted above. The formed fabric, once formulated as above, was cut into pieces for the manufacture of gloves using conventional techniques and the ultimate glove formulated had the desired properties noted above.

It will be appreciated that the degree of texture on the surface of the ultimate glove produced, in accordance with Example 1, may be varied according to the denier of the staple fiber utilized in the non-woven web. Also, the number of penetrations per square inch and the depth of penetration may be varied for this purpose. Preferably, for producing a garment capable of releasing moisture, the denier will be within the range of between about 1.5 and 6 denier, the density of penetration will be within the range of between about 450–700 penetrations per square inch, and the depth of penetration will be within the range of between about 0.25 and 0.50 inches.

EXAMPLE 2

In this example, the wearing apparel desired and ultimately produced is a fabric glove having a textured surface, and a moisture barrier property. In this example, a fibrous non-woven web of a suitable staple was selected having a denier of 15. It was used to supply fibers for combining the non-woven web and a knit fabric web both of polyester, using a density of penetration of 400 penetrations per square inch and a depth of onehalf inch in the needling procedure. Subsequently, the fabric pieces for joining together to prepare the fabric glove are cut and joined in the usual conventional procedures with the subsequent glove liners so constructed coated by dipping in an elastomeric compound according to Composition 1 above. Again, in this example, as with Example 1, the texture of a desired ultimate moisture-proof surface may be varied by selecting a different denier which may be within the range of between about 6 and 15, by selecting a different degree of penetration which may be within the range of between about 200 and 400 penetrations per square inch and a depth penetration which may be within the range of between about 0.25 and 0.50 inches.

While the above examples disclose procedures for making gloves as wearing apparel, it will be appreciated by those skilled in the art that the method of the invention here and the laminate so produced by the method may be utilized for any wearing apparel where a textured surface is desired with enhanced protective qualities and wherein the degree of texture from the method provides a wide latitude, both from the standpoint of gripping properties and, as will be appreciated, comfort and asthetic properties.

While the methods and products herein disclosed form preferred embodiments of the invention, this invention is not limited to those specific methods and products, and changes can be made therein without departing from the scope of the invention, which is defined in the appended claims. For example, as will be appreciated by practitioners in the art, various different elastomeric coatings may be utilized, selecting a wide variety of polymers, in order to have an ultimate final surface on the wearing apparel of varying properties which may include extremely soft pliable surfaces or hard impervious surfaces. Moreover, the formulations of those compositions may be varied in order to have a thicker or thinner coating, as required for comfort or protection, as will be appreciated.

What is claimed is:

1. A laminate for use in wearing apparel characterized by
   (a) a non-woven fibrous web containing staple fiber;
   (b) a woven or knitted web,
   (c) the staple fiber from said non-woven fibrous web having a denier within the range of between about 1.5 and 15;
   (d) the staple fiber from said non-woven fibrous web joining said non-woven and said woven or knitted webs together by needling with a density of penetration within the range of between about 400 and 700 penetrations per square inch;
   (e) said staple fiber extending from the exposed surface of said knitted web to form a basis for a subsequently applied textured coating; and
   (f) the exposed surface of said non-woven fibrous web forming the internal surface of wearing apparel produced by said laminate.

2. The laminate of claim 1, further characterized by
   (a) said non-woven fibrous web is comprised of materials selected from the group consisting of wool, polyester, polyolefins, polyamides, polyacrylonitrile, and mixtures thereof.

3. The laminate of claim 1, further characterized by
   (a) said woven or knitted web is comprised of materials selected from the group consisting of cotton, polyester, polyamide and mixtures thereof.

4. The laminate of claim 1, further characterized by
   (a) said staple fiber is polyamide.

5. The laminate of claim 1, further characterized by
   (a) said fibrous non-woven web is polyester; and
   (b) said woven or knitted web is a knitted jersey of polyester.

6. The laminate of claim 1, further characterized by
   (a) said laminate joined together by needling with said staple fiber having a depth of penetration of within the range of between about 0.25 and 0.50 inches.

7. A work glove liner, characterized by
   (a) the palm of said glove liner being a laminate, said laminate comprising
   (1) a non-woven fibrous web containing staple fiber;
   (2) a woven or knitted web;
   (3) the staple fiber from said non-woven fibrous web joining said non-woven web and said woven or knitted webs together;
   (4) said staple fiber extending from the exposed surface of said knitted web to form a basis for a subsequently applied textured coating;
   (5) the exposed surface of said non-woven fibrous web forming the internal surface of said work glove liner; and
   (b) the backside of said glove liner is comprised of woven or knitted textile.

8. The work glove liner of claim 7, further characterized by
   (a) an elastomeric coating applied to the outer surface of the said palm of the said glove liner to form a work glove.

9. The work glove liner of claim 8, further characterized by
   (a) said elastomeric coating is selected from the group consisting of polyvinyl chloride plastisol, natural rubber, and synthetic rubber.

10. A work glove liner, characterized by
    (a) the palm and the backside of said glove liner being a laminate, said laminate comprising
    (1) a non-woven fibrous web containing staple fiber;
    (2) a woven or knitted web;
    (3) the staple fiber from said non-woven fibrous web joining said non-woven web and said woven or knitted webs together;
    (4) said staple fiber extending from the exposed surface of said knitted web to form a basis for a subsequently applied textured coating; and
    (5) the exposed surface of said non-woven fibrous web forming the internal surface of said work glove liner.

11. The work glove liner of claim 10, further characterized by
    (a) an elastomeric coating applied to the outer surface of the palm and backside of said glove liner.

12. The work glove liner of claim 11, further characterized by
    (a) said elastomeric coating is selected from the group consisting of polyvinyl chloride plastisol, natural rubber, and synthetic rubber.

13. A work boot liner characterized by
    (a) at least a portion of said liner comprised of a laminate, said laminate comprising
    (1) a non-woven fibrous web containing staple fiber;
    (2) a woven or knitted web;
    (3) the staple fiber from said non-woven fibrous web joining said non-woven web and said woven or knitted webs together;

(4) said staple fiber extending from the exposed surface of said knitted web to form a basis for a subsequently applied textured coating; and (5) the exposed surface of said non-woven fibrous web forming the internal surface of said work boot liner;

(b) said laminate portion having an elastomeric coating thereon; and (c) said elastomeric coating selected from the group consisting of polyvinyl chloride plastisol; natural rubber, and synthetic rubber.

14. A work apron liner characterized by (a) at least a portion of said liner comprised of a laminate, said laminate comprising
   (1) a non-woven fibrous web containing staple fiber;
   (2) a woven or knitted web;
   (3) the staple fiber from said non-woven fibrous web joining said non-woven web and said woven or knitted webs together;
   (4) said staple fiber extending from the exposed surface of said knitted web to form a basis for a subsequently applied textured coating; and
   (5) the exposed surface of said non-woven fibrous web forming the internal surface of said work apron liner;

(b) said laminate portion having an elastomeric coating thereon; and (c) said elastomeric coating selected from the group consisting of polyvinyl chloride plastisol; natural rubber, and synthetic rubber.

15. A work glove characterized by (a) at least a portion of said glove comprised of a laminate, said laminate comprising
   (1) a non-woven fibrous web of staple fiber;
   (2) a woven or knitted web;
   (3) the staple fiber from said non-woven fibrous web joining said non-woven web and said woven or knitted webs together;
   (4) said staple fiber extending from the exposed surface of said woven or knitted web to form a base for a subsequently applied and textured coating; and
   (5) an elastomeric coating on said exposed surface of said woven or knitted web;

(b) said laminate being joined by said staple fiber by needling with a density of penetration within the range of between about 400 and 700 penetrations per square inch;

(c) the depth of penetration of said staple fiber being within the range of between about 0.25 and 0.50 inches; and (d) the denier of said fiber being within the range of between about 1.5 and 15.

16. The glove of claim 15, further characterized by
(a) said elastomeric coating is selected from the group consisting of polyvinyl chloride plastisol, natural rubbers and synthetic rubbers.

17. The glove of claim 15, further characterized by
(a) said non-woven fibrous web is comprised of materials selected from the group consisting of wool, polyester, polyolefins, polyamides, polyacrylonitrile, and mixtures thereof.

18. The glove of claim 15, further characterized by
(a) said woven or knitted web is comprised of materials selected from the group consisting of cotton, polyester, polyamide and mixtures thereof.

19. A method for producing a laminate useful in wearing apparel, characterized by (a) selecting in a first selecting step a fibrous non-woven web containing a staple fiber;

(b) selecting in a second selecting step a woven or knitted web;

(c) needling said fibrous non-woven web to said woven or knitted web with said staple fiber from said non-woven web;

(d) said needling step being carried out so that said staple fiber extends from the exposed surface of said woven or knitted web; and (e) said needling step being carried out by needling with a depth of penetration of within the range of between about 0.25 and 0.50 inches.

20. The method of claim 19, further characterized by
(a) said first selecting step is from materials selected from the group consisting of wool, polyester, polyolefins, polyamides, polyacrylonitrile, and mixtures thereof.

21. The method of claim 19, further characterized by
(a) said second selecting step is from materials selected from the group consisting of cotton, polyester, polyamides, and mixtures thereof.

22. The method of claim 19, further characterized by
(a) said staple fiber has a denier within the range of between about 1.5 and 15.

23. The method of claim 19, further characterized by
(a) said needling step is carried out with a degree of penetration of within the range of between about 400 and 700 penetrations per square inch.

24. A method for forming an item of wearing apparel, characterized by (a) forming a laminate for said apparel comprising the steps of
   (1) selecting in a first selecting step a fibrous non-woven web of staple fiber;
   (2) selecting in a second selecting step a woven or knitted web;
   (3) needling said fibrous non-woven web to said woven or knitted web with said staple fiber from said non-woven web; and
   (4) said needling step being carried out so that said staple fiber extends from the exposed surface of said woven or knitted web;

(b) forming an item of wearing apparel in which at least a portion thereof is comprised of said laminate formed in said needling step; and (c) applying an elastomeric coating to at least the said exposed surface of said woven or knitted web forming the exterior surface of said laminate portion of said wearing apparel formed in said forming step; and (d) curing said elastomeric coating.

25. The method of claim 24, further characterized by
(a) said elastomeric coating in said applying step is selected from the group consisting of polyvinyl chloride plastisol, natural rubber and synthetic rubber.

26. The method of claim 24, further characterized by
(a) said applying step being carried out by knife coating.

27. The method of claim 24, further characterized by
(a) said applying step being carried out by printing.

28. The method of claim 24, further characterized by
(a) said applying step being carried out by dipping.

* * * * *